(12) United States Patent
Tanabe (10) Patent No.: US 10,421,500 B2
(45) Date of Patent: Sep. 24, 2019

(54) VEHICLE FRAMEWORK STRUCTURE

(71) Applicant: TOYOTA JIDOSHA KABUSHIKI KAISHA, Toyota-shi, Aichi-ken (JP)

(72) Inventor: Daisuke Tanabe, Nisshin (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 48 days.

(21) Appl. No.: 15/846,682

(22) Filed: Dec. 19, 2017

(65) Prior Publication Data

US 2018/0222535 A1 Aug. 9, 2018

(30) Foreign Application Priority Data

Feb. 7, 2017 (JP) ................................. 2017-020638

(51) Int. Cl.
| | |
|---|---|
| *B60J 7/00* | (2006.01) |
| *B62D 25/20* | (2006.01) |
| *B62D 21/02* | (2006.01) |
| *B62D 25/02* | (2006.01) |
| *B62D 21/15* | (2006.01) |

(52) U.S. Cl.
CPC ......... *B62D 25/2036* (2013.01); *B62D 21/02* (2013.01); *B62D 25/025* (2013.01); *B62D 21/157* (2013.01)

(58) Field of Classification Search
CPC ........ B62D 21/152; B62D 25/06; B62D 1/28; B60G 21/055; B60G 3/20; B60R 19/34; B60P 3/08; G07B 15/063; G01S 13/931; G01C 21/28

USPC .................................................. 296/193.07
See application file for complete search history.

(56) References Cited

U.S. PATENT DOCUMENTS

| | | | | |
|---|---|---|---|---|
| 1,663,036 A | * | 3/1928 | Ashe ...................... | B61C 17/02 |
| | | | | 105/236 |
| 2,072,804 A | * | 3/1937 | Mussey .................... | B61F 1/00 |
| | | | | 105/402 |
| 2,335,216 A | * | 11/1943 | Suekfield ............. | B61D 17/043 |
| | | | | 105/404 |

(Continued)

FOREIGN PATENT DOCUMENTS

| | | |
|---|---|---|
| CN | 201347134 Y | 11/2009 |
| JP | H06-032247 A | 2/1994 |

(Continued)

*Primary Examiner* — Kiran B Patel
(74) *Attorney, Agent, or Firm* — Oliff PLC (57) ABSTRACT

A vehicle framework structure includes: a pair of rockers extending in a front-rear direction along outer periphery edge portions of a floor portion; plural cross-members that extend in a width direction and span between the rockers, width direction outer end portions of the cross-members being joined to the respective rockers; and a linking cross-member that spans between a first side wall portion of one cross-member and a second side wall portion of another cross-member, the one cross-member and the another cross-member being adjacent in the front-rear direction, the second side wall portion opposing the first side wall portion in the front-rear direction, an end portion at one side in the front-rear direction of the linking cross-member being joined to the first side wall portion, and an end portion at the other side in the front-rear direction of the linking cross-member being joined to the second side wall portion.

3 Claims, 3 Drawing Sheets

(56) References Cited

U.S. PATENT DOCUMENTS

| | | | | | |
|---|---|---|---|---|---|
| 2,441,106 | A | * | 5/1948 | Theriault | B62D 53/06 296/184.1 |
| 2,565,709 | A | * | 8/1951 | Watter | B61D 17/10 105/397 |
| 2,621,059 | A | * | 12/1952 | Ridgway | B62D 21/20 280/789 |
| 2,646,009 | A | * | 7/1953 | Dean | B61F 1/10 105/420 |
| 3,108,836 | A | * | 10/1963 | Deckert | B62D 21/00 280/793 |
| H001587 | H | * | 9/1996 | Van Valkenburgh | 280/789 |
| 8,550,315 | B2 | * | 10/2013 | Houser | B60G 13/16 224/42.13 |
| 8,556,336 | B2 | * | 10/2013 | Yasuhara | B62D 21/11 296/193.07 |
| 9,403,498 | B2 | * | 8/2016 | Hoschouer | B60R 19/34 |
| 2004/0100126 | A1 | * | 5/2004 | Kawabe | B62D 21/157 296/193.07 |
| 2006/0121795 | A1 | | 6/2006 | Hashimura et al. | |
| 2008/0066886 | A1 | * | 3/2008 | Mabuchi | B60K 13/04 165/67 |
| 2013/0088045 | A1 | * | 4/2013 | Charbonneau | B62D 21/157 296/187.12 |
| 2017/0217498 | A1 | * | 8/2017 | Akhlaque-e-rasul | B60K 1/04 |
| 2018/0126835 | A1 | * | 5/2018 | Saeki | B60G 13/001 |

FOREIGN PATENT DOCUMENTS

| | | |
|---|---|---|
| JP | 2005-132348 A | 5/2005 |
| JP | 2011-240762 A | 12/2011 |

* cited by examiner

VEHICLE FRAMEWORK STRUCTURE

CROSS-REFERENCE TO RELATED APPLICATION

This application is based on and claims priority under 35 USC 119 from Japanese Patent Application No. 2017-020638 filed on Feb. 7, 2017, the disclosure of which is incorporated by reference herein.

BACKGROUND

Technical Field

The present disclosure relates to a vehicle framework structure.

Related Art

Chinese Utility Model Registration No. 201347134Y discloses a technology relating to a floor structure of an electric car. In this floor structure for an electric car, a vehicle body is structured with a pair of side members extending in a vehicle front-rear direction, three cross-members spanning between the side members, and a reinforcing member that links the cross-members in the vehicle front-rear direction and extends in the vehicle front-rear direction. Consequently, when an impact load is applied to one of the side members in the vehicle width direction during a side collision of the vehicle (referred to as "a side impact" below) and a cross-member starts to deform to bend in the vehicle front-rear direction, portions of the impact load are dispersed between the three cross-members via the reinforcing member. Hence, deformation of the vehicle body during a side impact may be suppressed with this technology.

In this technology, however, the reinforcing member links the cross-members in a state in which the reinforcing member is disposed at the vehicle lower side of the three cross-members. Therefore, the reinforcing member supports each cross-member at a position that is distant from a neutral axis of bending of the cross-member in the vehicle front-rear direction during a side impact of the vehicle. Thus, there is scope for improvement of this technology in regard to reducing bending deformation in the vehicle front-rear direction of a cross-member that is caused by an impact load in the vehicle width direction during a side impact of the vehicle, and hence reducing deformation of the vehicle body.

SUMMARY

In consideration of the circumstances described above, the present disclosure provides a vehicle framework structure that may reduce deformation of a vehicle body by an impact load in a vehicle width direction during a side impact of the vehicle.

An aspect of the present disclosure is a vehicle framework structure including: a pair of rockers that structure portions of a vehicle body, the rockers extending in a vehicle front-rear direction along periphery edge portions at vehicle width direction outer sides of a floor portion of the vehicle body; plural cross-members that extend in a vehicle width direction and span between the rockers, end portions at the vehicle width direction outer sides of the cross-members being joined to the respective rockers; and a linking cross-member that spans between a first side wall portion structuring a portion of one of the cross-members and extending in the vehicle width direction and a second side wall portion structuring a portion of another of the cross-members and extending in the vehicle width direction, the one cross-member and the another cross-member being adjacent in the vehicle front-rear direction, the second side wall portion opposing the first side wall portion in the vehicle front-rear direction, an end portion at one side in the vehicle front-rear direction of the linking cross-member being joined to the first side wall portion, and an end portion at the other side in the vehicle front-rear direction of the linking cross-member being joined to the second side wall portion.

According to the present aspect, the pair of rockers structuring portions of the vehicle body along the periphery edge portions at the vehicle width direction outer sides of the floor portion of the vehicle body extend in the vehicle front-rear direction. The plural cross-members extending in the vehicle width direction span between the pair of rockers, and the end portions at the vehicle width direction outer sides of the cross-members are joined to the respective rockers. Consequently, during a side impact of the vehicle, an impact load applied to one of the rockers is dispersed between the plural cross-members in the process of being transmitted through the plural cross-members to the other of the rockers, and is braced by the other of the rockers.

Now, when an impact load is applied to a cross-member in a vehicle width direction, it is expected that a moment to bend the cross-member in the vehicle front-rear direction will be produced in the cross-member and that the cross-member will deform to bend in the vehicle front-rear direction. In order to suppress this bending deformation of a cross-member by an impact load in the vehicle width direction, linking cross-members to one another with a linking member to disperse the impact load may be considered. However, bracing a cross-member with a linking member at a position that is distant from a neutral axis of the bending in the vehicle front-rear direction of the cross-member may be insufficiently effective.

In the present aspect, however, the linking cross-member spans between the first side wall portion, which structures a portion of the one cross-members that are adjacent in the vehicle front-rear direction and extends in the vehicle width direction, and the second side wall portion, which structures a portion of the another cross-members, extends in the vehicle width direction and opposes the first side wall portion. The end portion at the one side in the vehicle front-rear direction of the linking cross-member is joined to the first side wall portion of the one cross-member, and the end portion at the other side in the vehicle front-rear direction of the linking cross-member is joined to the second side wall portion of the another cross-member. Therefore, during a side impact of the vehicle in the present aspect, the cross-members that are adjacent in the vehicle front-rear direction may be braced at positions that are closer to neutral axes of bending in the vehicle front-rear direction of the cross-members than in a structure in which cross-members are linked by a linking member disposed at the vehicle lower side of the cross-members. Therefore, even if a cross-member starts to deform to bend in the vehicle front-rear direction due to an impact load in the vehicle width direction, the impact load may be dispersed between the cross-members that are adjacent in the vehicle front-rear direction and the linking cross-member, and bending deformation of the cross-member may be reduced.

Thus, the vehicle framework structure according to the present aspect may reduce deformation of the vehicle body by an impact load in the vehicle width direction during a side impact of the vehicle.

In the present aspect, a plural number of the linking cross-member may be arranged in the vehicle width direction.

According to the structure described above, because the plural linking cross-members are arranged in the vehicle width direction, during a side impact of the vehicle, plural load transmission paths may be formed between the cross-members that are adjacent in the vehicle front-rear direction.

Thus, the vehicle framework structure according to the structure described above may improve a degree of certainty with which an impact load in the vehicle width direction during a side impact of the vehicle is dispersed in the vehicle body.

In the present aspect: a portion of the floor portion may include a floor panel that extends in the vehicle width direction and the vehicle front-rear direction; cross-sectional shapes of the cross-members seen in the vehicle width direction and a cross-sectional shape of the linking cross-member seen in the vehicle front-rear direction may be formed as hat shapes that are open to a side thereof at which the floor panel is disposed, and the cross-members and linking cross-member are joined to the floor panel; and the vehicle framework structure may be configured to accommodate an electric power supply component capable of supplying electric power to a power unit installed in the vehicle at a location that is at the vehicle lower side of the floor panel and between the rockers as seen in the vehicle vertical direction.

According to the structure described above, a portion of the floor portion is structured by the floor panel that extends in the vehicle width direction and in the vehicle front-rear direction, and the electric power supply component is disposed at locations at the vehicle lower side of the floor panel, between the rockers as seen in the vehicle vertical direction. Therefore, space at the vehicle lower side of the floor panel may be used for disposition of the electric power supply component, and power may be supplied by the electric power supply component to the power unit installed in the vehicle.

Now, if the vehicle body is deformed by an impact load in a vehicle width direction during a side impact of the vehicle, the deformation is likely to also affect the electric power supply component disposed at the vehicle lower side of the floor panel.

In the present aspect, however, the cross-sectional shapes of the cross-members seen in the vehicle width direction and the cross-sectional shape(s) of the linking cross-member(s) seen in the vehicle front-rear direction are hat shapes that open to the side thereof at which the floor panel is disposed, and the cross-members and the linking cross-member are joined to the floor panel. Thus, the cross-members and the linking cross-member may respectively form chamber structures with the floor panel. As a result, stiffness of the vehicle body with respect to an impact load in the vehicle width direction may be assured, and effects of the impact load on the electric power supply component may be moderated.

Thus, the vehicle framework structure according to the structure described above may suppress deformation of the vehicle body by an impact load in the vehicle width direction during a side impact of the vehicle, and the electric power supply component may be disposed in a secure state.

BRIEF DESCRIPTION OF THE DRAWINGS

An exemplary embodiment of the present disclosure will be described in detail based on the following figures, wherein.

DETAILED DESCRIPTION

Figure 1:
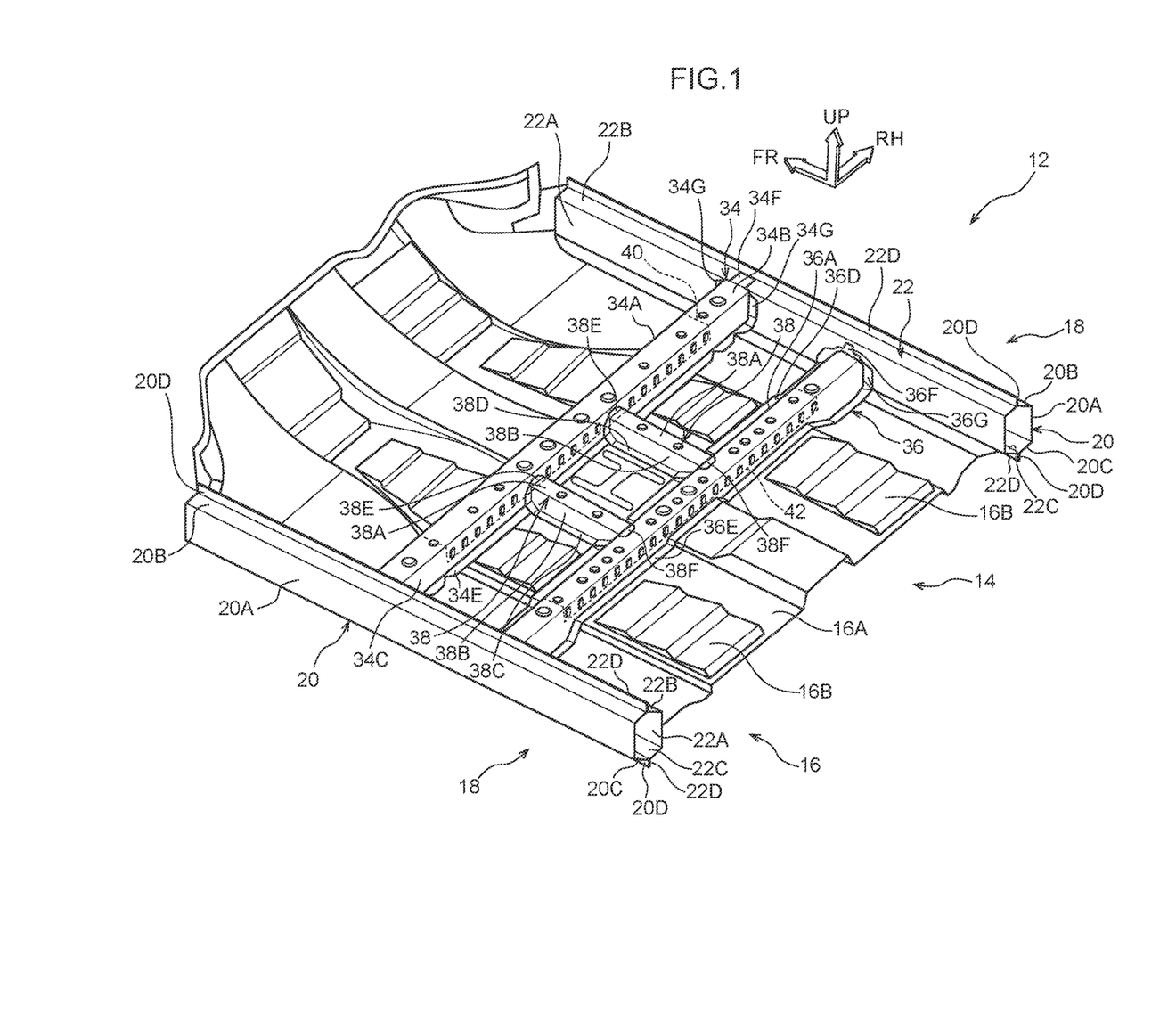
FIG. 1 is a perspective view, seen from a vehicle outer-rear side, illustrating structures of a floor portion of a vehicle in which a vehicle framework structure according to an exemplary embodiment is employed.
Figure 2:
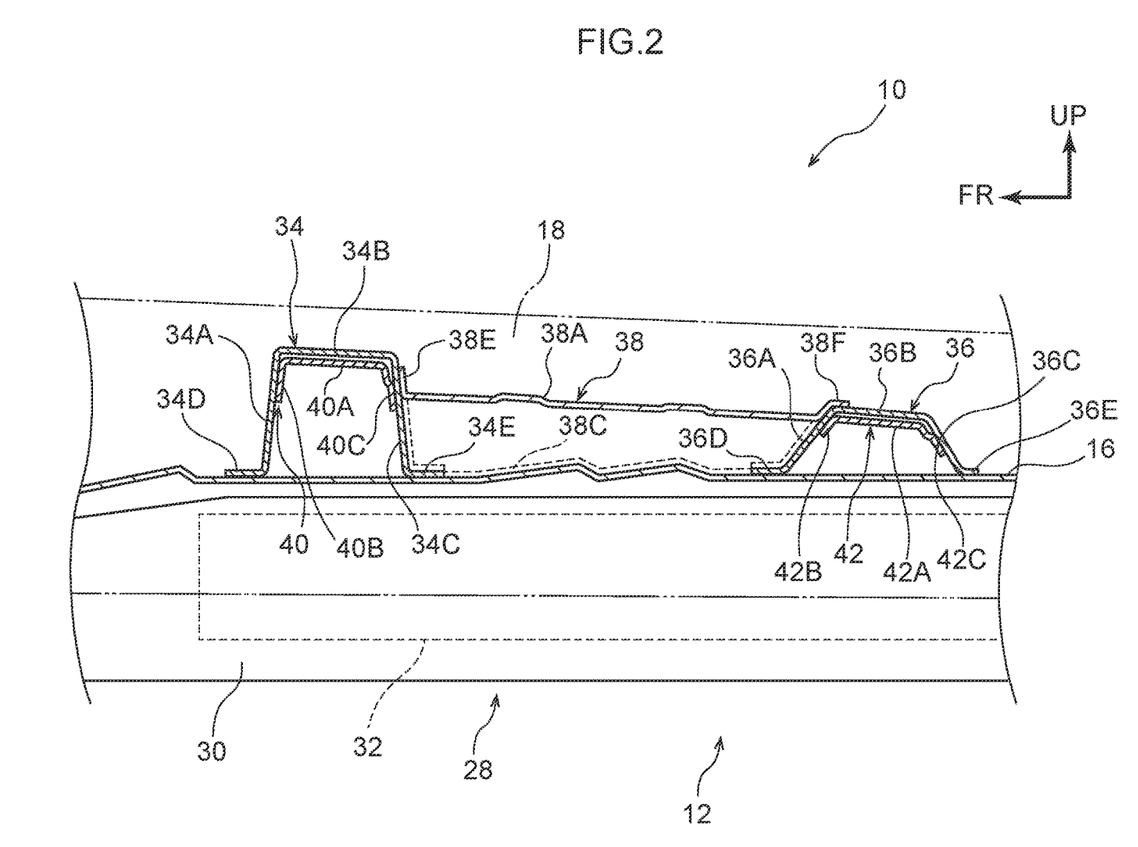
FIG. 2 is an enlarged sectional diagram, seen from the vehicle width direction outer side (a sectional diagram illustrating a state cut along line 2-2 in FIG. 3), illustrating local structures of the floor portion of the vehicle in which the vehicle framework structure according to the exemplary embodiment is employed.
Figure 3:
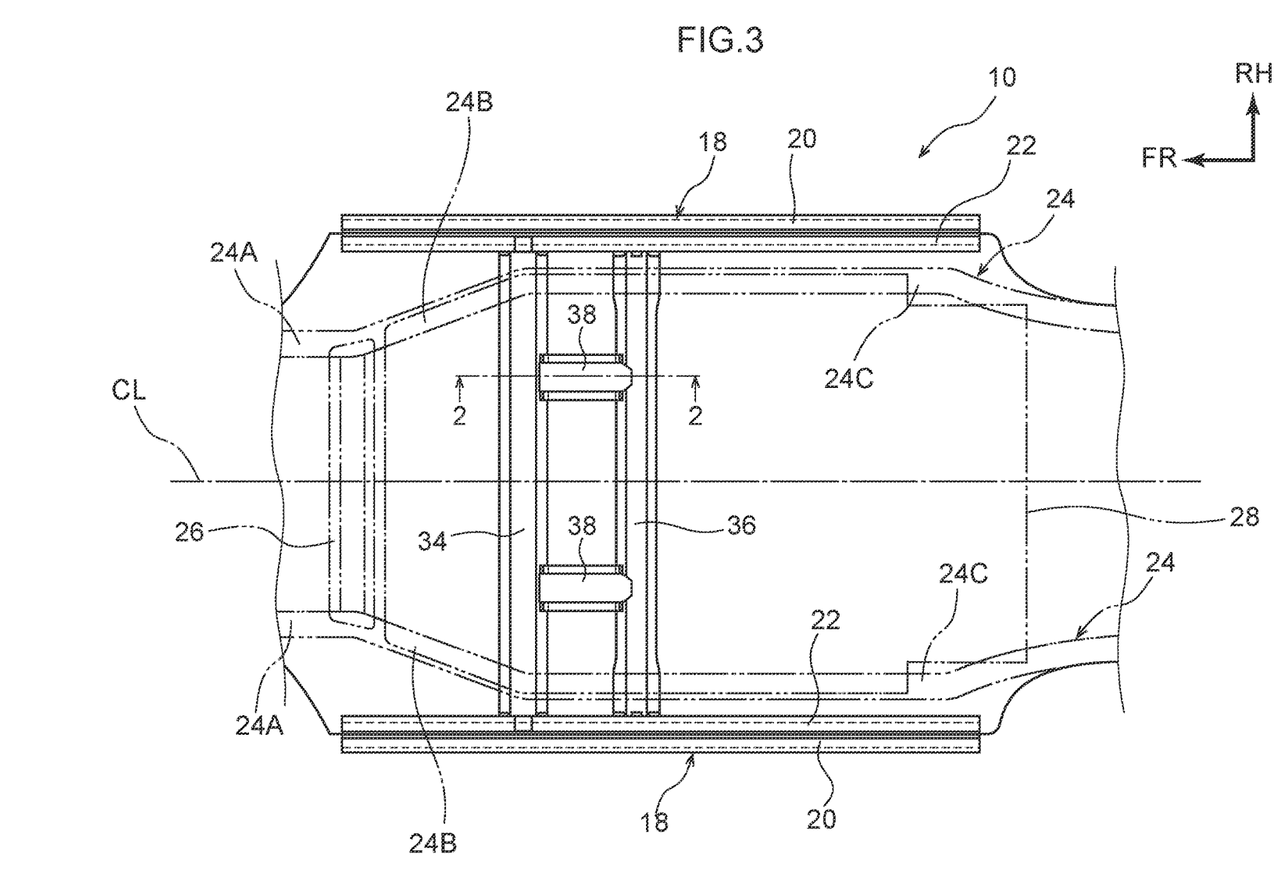
FIG. 3 is a plan view illustrating structures of the floor portion of the vehicle in which the vehicle framework structure according to the exemplary embodiment is employed.

Herebelow, an exemplary embodiment of the vehicle framework structure according to the present disclosure is described using FIG. 1 to FIG. 3. An arrow FR that is illustrated in the drawings indicates a vehicle front side, an arrow UP indicates a vehicle upper side, and an arrow RH indicates a vehicle width direction right side.

First, general structures of a vehicle 10 in which the vehicle framework structure according to the exemplary embodiment is employed are described using the drawings. In the exemplary embodiment, the vehicle 10 is basically structured with left-right symmetry. Accordingly, structures in a region at the vehicle width direction right side of the vehicle 10 are principally described below; descriptions of structures in the region at the vehicle width direction left side are omitted.

As illustrated in FIG. 2, the vehicle 10 includes a vehicle body 12, a power unit such as a motor or the like, and a battery pack 28 that serves as an electric power supply component. The power unit, which is not illustrated in the drawings, is mounted at the vehicle body 12. Similarly, the battery pack 28, which is described below, is mounted at the vehicle body 12. The power unit is supplied with electric power from the battery pack 28 and is driven, and the vehicle 10 runs by driving force generated by the power unit.

As illustrated in FIG. 1, the vehicle body 12 is provided with a floor panel 16 that structures a portion of a floor portion 14 at the vehicle lower side of the vehicle body 12. As seen in the vehicle vertical direction, the floor panel 16 extends in the vehicle front-rear direction and the vehicle width direction. The floor panel 16 is formed by pressing of steel plate, and includes a front panel portion 16A and a rear panel portion, which is not illustrated in the drawings. The front panel portion 16A principally configures a region at the vehicle front side of the floor panel 16 and the rear panel portion configures a region at the vehicle rear side.

More specifically, the front panel portion 16A is formed in a plate shape that extends in the vehicle front-rear direction and the vehicle width direction. The front panel portion 16A is reinforced by plural bead portions 16B being formed thereat. A bulge portion that bulges to form a protrusion toward the vehicle upper side is formed at the rear panel portion. A portion of the battery pack 28 is accommodated inside the bulge portion.

At the vehicle width direction outer sides of the floor panel 16, a pair of rockers 18 are disposed along periphery edge portions at the vehicle width direction outer sides of the floor panel 16 (i.e., of the floor portion 14). Each rocker 18 extends in the vehicle front-rear direction, includes an outer rocker 20 and an inner rocker 22, and is formed of steel. The outer rocker 20 structures a portion at the vehicle width direction outer side of the rocker 18 and the inner rocker 22 structures a portion at the vehicle width direction inner side of the rocker 18.

In more detail, the outer rocker 20 includes a side wall portion 20A, an upper wall portion 20B, a lower wall portion 20C, and a pair of flange portions 20D. A cross-sectional shape of the outer rocker 20 seen in the vehicle front-rear direction is formed as a hat shape whose vehicle width direction inner side is open. The side wall portion 20A structures a portion at the vehicle width direction outer side of the outer rocker 20. The side wall portion 20A is formed in a plate shape that extends in the vehicle front-rear direction with the plate thickness direction in the vehicle width direction. The upper wall portion 20B protrudes upward toward the vehicle inner side from a periphery edge portion at the vehicle upper side of the side wall portion 20A. The lower wall portion 20C projects downward toward the vehicle inner side from a periphery edge portion at the vehicle lower side of the side wall portion 20A. The flange portions 20D project to the vehicle upper side from a periphery edge portion at the vehicle upper side of the upper wall portion 20B and to the vehicle lower side from a periphery edge portion at the vehicle lower side of the lower wall portion 20C.

The inner rocker 22 has a structure that is basically symmetrical with the rocker outer 20 about an axis extending in the vehicle vertical direction. Specifically, the inner rocker 22 includes a side wall portion 22A, an upper wall portion 22B, a lower wall portion 22C, and a pair of flange portions 22D. A cross-sectional shape of the inner rocker 22 seen in the vehicle front-rear direction is formed as a hat shape whose vehicle width direction outer side is open. The flange portions 20D and flange portions 22D are joined together at joining portions by welds or the like, which are not illustrated in the drawings. Thus, the outer rocker 20 and inner rocker 22 form a chamber structure whose cross-sectional shape seen in the vehicle front-rear direction is a substantially hexagonal closed chamber.

Respective impact absorbers, which are not illustrated in the drawings, are disposed at the vehicle lower side of the outer rocker 20 and the inner rocker 22. These impact absorbers are formed in hexagonal tube shapes extending in the vehicle front-rear direction of extruded aluminium members. The impact absorbers are fixed to the outer rocker 20 and the inner rocker 22 by respective fastening members, which are not illustrated in the drawings, such as bolts or the like.

As illustrated in FIG. 3, a left and right pair of side members 24 are disposed at the vehicle lower side of the floor panel 16. The side members 24 configure portions of a framework of the vehicle body 12 that extend in the vehicle front-rear direction. Each side member 24 includes a side member front portion 24A, an inflected portion 24B and a floor side portion 24C, arranged in this order from the vehicle front side. The side member 24 is formed of steel with a cross-sectional shape seen in the length direction thereof formed as a hat shape that is open to the side thereof at which the floor panel 16 is disposed.

The side member front portion 24A structures a portion at the vehicle front side of the side member 24. Seen in the vehicle vertical direction, the side member front portion 24A extends linearly in the vehicle front-rear direction. The inflected portion 24B extends so as to spread toward the vehicle width direction outer side from the side member front portion 24A, as seen in the vehicle vertical direction. The floor side portion 24C extends linearly in the vehicle front-rear direction at the vehicle lower side of the floor panel 16, in a state in which a predetermined gap in the vehicle width direction is formed between the floor side portion 24C and the rocker 18.

The side member 24 is joined to the floor panel 16 at joining portions by welds or the like, which are not illustrated in the drawings. Thus, the side member 24 forms a chamber structure with the floor panel 16. Inflection points between the respective side member front portions 24A and inflected portions 24B are linked with one another by a cross-member 26 that extends in the vehicle width direction. The battery pack 28 is mounted to the side members 24 with the structure described above. Thus, the battery pack 28 is disposed at the vehicle lower side of the floor panel 16.

As illustrated in FIG. 2, the battery pack 28 includes a battery case 30 fabricated of aluminium, which structures an outer casing of the battery pack 28, and a battery module 32, which is disposed inside the battery case 30. A plural number of the battery module 32 are stacked in the vehicle vertical direction in a region at the vehicle rear side of the battery case 30. The battery module 32 at the vehicle upper side thereof is disposed inside the bulge portion of the rear panel portion. The battery pack 28 is disposed in a state in which a gap is formed between the battery pack 28 and the floor panel 16, in which state the major portion of the battery pack 28 is accommodated at the vehicle width direction inner sides of the side members 24. As illustrated in FIG. 3, the side members 24 are disposed at the vehicle width direction inner sides of the rockers 18. Therefore, the battery pack 28 is disposed at locations between the rockers 18 as seen in the vehicle vertical direction.

A first characteristic of the present exemplary embodiment is that the rockers 18 are linked with one another by cross-members 34 and 36 that are fabricated of steel and are disposed at the vehicle upper side of the floor panel 16. A second characteristic of the present exemplary embodiment is that the cross-members 34 and 36 are linked by a pair of linking cross-members 38 fabricated of steel. Below, structures of the cross-members 34 and 36 and the linking cross-members 38 that configure principal portions of the present exemplary embodiment are described in detail.

First, structures of the cross-member 34 are described using FIG. 1 and FIG. 2. The cross-member 34 extends in the vehicle width direction. As illustrated in FIG. 3, seen in the vehicle vertical direction, the cross-member 34 is disposed so as to be superposed with a line joining inflection points of the respective inflected portions 24B and floor side portions 24C of the side members 24 with one another. The cross-member 34 includes a front wall portion 34A, an upper wall portion 34B, a rear wall portion 34C that serves as a first side wall portion, a front side flange portion 34D, a rear side flange portion 34E, upper side flange portions 34F and outer side flange portions 34G. A cross-sectional shape of the cross-member 34 seen in the vehicle width direction is formed as a hat shape of which the vehicle lower side is open.

More specifically, the upper wall portion 34B structures a portion at the vehicle upper side of the cross-member 34 and is formed in a rectangular plate shape that extends in the vehicle width direction with the plate thickness direction in the vehicle vertical direction. The front wall portion 34A projects to the vehicle lower side from a periphery edge portion at the vehicle front side of the upper wall portion 34B. The front wall portion 34A structures a portion at the vehicle front side of the cross-member 34. The front wall portion 34A is formed in a rectangular plate shape that extends in the vehicle width direction with the plate thickness direction in the vehicle front-rear direction.

The rear wall portion 34C projects to the vehicle lower side from a periphery edge portion at the vehicle rear side of the upper wall portion 34B. The rear wall portion 34C structures a portion at the vehicle rear side of the cross-member 34. The rear wall portion 34C is formed in a rectangular plate shape that extends in the vehicle width direction with the plate thickness direction in the vehicle front-rear direction.

The front side flange portion 34D projects to the vehicle front side from a periphery edge portion at the vehicle lower side of the front wall portion 34A, and the rear side flange portion 34E projects to the vehicle rear side from a periphery edge portion at the vehicle lower side of the rear wall portion 34C. The front side flange portion 34D and rear side flange portion 34E are joined to the floor panel 16 by respective joining portions with welds or the like, which are not illustrated in the drawings.

The outer side flange portions 34G project to the vehicle front side from periphery edge portions at the vehicle width direction outer sides of the front wall portion 34A and to the vehicle rear side from periphery edge portions at the vehicle width direction outer sides of the rear wall portion 34C. The outer side flange portions 34G are joined to the side wall portions 22A of the inner rockers 22 by joining portions with welds or the like, which are not illustrated in the drawings. The outer side flange portions 34G at the vehicle front side are provided to be continuous with the front side flange portion 34D and the outer side flange portions 34G at the vehicle rear side are provided to be continuous with the rear side flange portion 34E.

The upper side flange portions 34F project to the vehicle width direction outer sides from periphery edge portions at the vehicle width direction outer sides of the upper wall portion 36B, and are joined to the upper wall portions 22B of the inner rockers 22 by joining portions with welds or the like, which are not illustrated in the drawings. The outer side flange portions 34G and upper side flange portions 34F described above are provided at the respective end portions at the vehicle width direction outer sides of the cross-member 34. Thus, the end portions at the vehicle width direction outer sides of the cross-member 34 may be considered to be joined to the rockers 18. The cross-member 34 structured as described above forms a chamber space together with the floor panel 16 and the rockers 18. A reinforcing member 40 fabricated of steel is disposed in this chamber space.

The reinforcing member 40 extends along the cross-member 34 and includes an upper wall portion 40A, a front wall portion 40B and a rear wall portion 40C. A cross-sectional shape of the reinforcing member 40 seen in the vehicle width direction is formed as a "U" shape of which the vehicle lower side is open. The front wall portion 40B of the reinforcing member 40 is joined to the front wall portion 34A of the cross-member 34 and the rear wall portion 40C is joined to the rear wall portion 34C of the cross-member 34 by respective joining portions with welds or the like, which are not illustrated in the drawings.

The cross-member 36 extends in the vehicle width direction and is disposed adjacent to the cross-member 34 at the vehicle rear side thereof, in a state in which a predetermined gap is formed between the cross-member 36 and the cross-member 34. The cross-member 36 has basically the same structure as the cross-member 34. The cross-member 36 is provided with a front wall portion 36A that serves as a second side wall portion, an upper wall portion 36B, a rear wall portion 36C, a front side flange portion 36D, a rear side flange portion 36E, upper side flange portions 36F and outer side flange portions 36G. The cross-member 36 differs from the cross-member 34 in the shapes of the upper side flange portions 36F. The cross-member 34 and cross-member 36 are positioned such that the rear wall portion 34C of the cross-member 34 and the front wall portion 36A of the cross-member 36 are disposed to oppose one another.

The upper side flange portions 36F project to the vehicle upper side from periphery edge portions at the vehicle width direction outer sides of the upper wall portion 36B, and are continuous with the outer side flange portions 36G. The upper side flange portions 36F are joined to the side wall portions 22A of the inner rockers 22 along with the outer side flange portions 36G by joining portions with welds or the like, which are not illustrated in the drawings. The outer side flange portions 36G and upper side flange portions 36F described above are provided at the respective end portions at the vehicle width direction outer sides of the cross-member 36. Thus, the end portions at the vehicle width direction outer sides of the cross-member 36 may be considered to be joined to the rockers 18.

The cross-sectional shape of the cross-member 36 seen in the vehicle width direction differs from the cross-member 34. A width of the cross-member 36 in the vehicle front-rear direction is narrower than the cross-member 34 at the vehicle upper side, but spreads to be wider than the cross-member 34 at the vehicle lower side. Moreover, seen in the vehicle width direction, a position of the upper wall portion 36B of the cross-member 36 is set to be at the vehicle lower side relative to the upper wall portion 34B of the cross-member 34.

A reinforcing member 42 is mounted in a chamber space formed by the cross-member 36, the floor panel 16 and the rockers 18. The reinforcing member 42 has a basically similar structure to the reinforcing member 40. The reinforcing member 42 includes an upper wall portion 42A, a front wall portion 42B and a rear wall portion 42C. The front wall portion 42B of the reinforcing member 42 is joined to the front wall portion 36A of the cross-member 36 and the rear wall portion 42C is joined to the rear wall portion 36C of the cross-member 36 by respective joining portions with welds or the like, which are not illustrated in the drawings.

Now, structures of the linking cross-members 38 are described. The linking cross-members 38 extend in the vehicle front-rear direction and, as illustrated in FIG. 3, are disposed to be symmetrical with respect to a center line CL of the vehicle 10 that extends in the vehicle front-rear direction, at locations that are separated by predetermined spacings to the vehicle width direction outer sides from the center line CL. Specifically, seen in the vehicle vertical direction, each linking cross-member 38 is disposed so as to be closer to the center line CL than the rocker 18. The linking cross-member 38 includes an upper wall portion 38A, a pair of side wall portions 38B, an outer side flange portion 38C, an inner side flange portion 38D, a front side flange portion 38E and a rear side flange portion 38F. A cross-sectional shape of the linking cross-member 38 seen in the vehicle front-rear direction is formed as a hat shape of which the vehicle lower side is open.

In more detail, the upper wall portion 38A structures a portion at the vehicle upper side of the linking cross-member 38 and is formed in a rectangular plate shape that extends in the vehicle front-rear direction with the plate thickness direction in the vertical direction. The side wall portions 38B respectively project to the vehicle lower side from periphery edge portions of the upper wall portion 38A that extend in the vehicle front-rear direction. The side wall portions 38B are formed in rectangular plate shapes that extend in the vehicle front-rear direction with the plate thickness directions in the vehicle width direction.

The outer side flange portion 38C projects to the vehicle width direction outer side from a periphery edge portion at the vehicle lower side of the side wall portion 38B that is at the vehicle width direction outer side, and the inner side flange portion 38D projects to the vehicle width direction inner side from a periphery edge portion at the vehicle lower side of the side wall portion 38B that is at the vehicle width direction inner side. The outer side flange portion 38C and inner side flange portion 38D are joined to the floor panel 16 by joining portions with welds or the like, which are not illustrated in the drawings.

The front side flange portion 38E is provided to project to the vehicle upper side from a periphery edge portion at the vehicle front side of the upper wall portion 38A, to the vehicle width direction outer side from a periphery edge portion at the vehicle front side of the side wall portion 38B that is at the vehicle width direction outer side, and to the vehicle width direction inner side from a periphery edge portion at the vehicle front side of the side wall portion 38B that is at the vehicle width direction inner side. The front side flange portion 38E is joined to the rear wall portion 34C of the cross-member 34 by joining portions with welds or the like, which are not illustrated in the drawings.

The rear side flange portion 38F has a basically similar structure to the front side flange portion 38E and is joined to the front wall portion 36A of the cross-member 36 by joining portions with welds or the like, which are not illustrated in the drawings. However, the rear side flange portion 38F differs from the front side flange portion 38E in that a portion is disposed so as to cover over the upper wall portion 36B of the cross-member 36 from the vehicle upper side thereof, and the rear side flange portion 38F is joined to the upper wall portion 36B by a joining portion with a weld or the like, which is not illustrated in the drawings. In the linking cross-member 38 described above, the front side flange portion 38E is provided at an end portion at the vehicle front side of the linking cross-member 38 and the rear side flange portion 38F is provided at an end portion at the vehicle rear side of the linking cross-member 38. Therefore, the linking cross-member 38 may be considered to be joined to the rear wall portion 34C of the cross-member 34 at the end portion at one side in the vehicle front-rear direction thereof and joined to the front wall portion 36A of the cross-member 36 at the end portion at the other side in the vehicle front-rear direction thereof.

Operation and Effects of the Exemplary Embodiment

Now, operation and effects of the exemplary embodiment are described.

In the present exemplary embodiment, as illustrated in FIG. 1, the pair of rockers 18 that structure portions of the vehicle body 12 extend in the vehicle front-rear direction along the periphery edge portions at the vehicle width direction outer sides of the floor portion 14 of the vehicle body 12. The cross-members 34 and 36 that extend in the vehicle width direction span between the pair of rockers 18, and the end portions at the vehicle width direction outer sides of the cross-members 34 and 36 are joined to the respective rockers 18. Consequently, during a side impact of the vehicle 10, an impact load applied to one of the rockers 18 is dispersed between the cross-members 34 and 36 in the process of being transmitted through the cross-members 34 and 36 to the other of the rockers 18, and is braced by the other of the rockers 18.

Now, when an impact load is applied to the cross-members 34 and 36 in the vehicle width direction, it is expected that moments to bend the cross-members 34 and 36 in the vehicle front-rear direction will be produced in the cross-members 34 and 36, and that the cross-members 34 and 36 will deform to bend in the vehicle front-rear direction. In order to suppress this bending deformation of the cross-members 34 and 36 by an impact load in the vehicle width direction, linking the cross-member 34 and the cross-member 36 to one another with a linking member to disperse the impact load may be considered. However, bracing the cross-members 34 and 36 with a linking member at positions that are distant from neutral axes of bending in the vehicle front-rear direction of the cross-members 34 and 36 may be insufficiently effective.

In the present exemplary embodiment, however, the linking cross-members 38 span between the rear wall portion 34C, which structures a portion of the cross-member 34 and extends in the vehicle width direction, and the front wall portion 36A, which structures a portion of the cross-member 36, extends in the vehicle width direction and opposes the rear wall portion 34C. As illustrated in FIG. 2, the end portions at the one side in the vehicle front-rear direction of the linking cross-members 38 are joined to the rear wall portion 34C of the cross-member 34 and the end portions at the other side in the vehicle front-rear direction of the linking cross-members 38 are joined to the front wall portion 36A of the cross-member 36. Therefore, during a side impact of the vehicle 10 according to the present exemplary embodiment, the cross-members 34 and 36 that are adjacent in the vehicle front-rear direction may be braced at positions that are closer to neutral axes of bending in the vehicle front-rear direction of the cross-members 34 and 36 than in a structure in which the cross-members 34 and 36 are linked by linking members that are disposed at the vehicle lower side of the cross-members 34 and 36. Therefore, even if the cross-members 34 and 36 start to deform to bend in the vehicle front-rear direction due to an impact load in the vehicle width direction, the impact load may be dispersed between the cross-members 34 and 36 that are adjacent in the vehicle front-rear direction and the linking cross-members 38, and bending deformation of the cross-members 34 and 36 may be reduced. Thus, in the present exemplary embodiment, deformation of the vehicle body 12 by an impact load in the vehicle width direction during a side impact of the vehicle 10 may be reduced.

In the present exemplary embodiment, because plural linking cross-members 38 are arranged in the vehicle width direction, during a side impact of the vehicle 10, plural load transmission paths may be formed between the cross-members 34 and 36 that are adjacent in the vehicle front-rear direction. As a result, in the present exemplary embodiment, a degree of certainty with which an impact load in the vehicle width direction during a side impact of the vehicle 10 is dispersed in the vehicle body 12 may be improved.

In the present exemplary embodiment, a portion of the floor portion 14 is structured by the floor panel 16 that extends in the vehicle width direction and in the vehicle front-rear direction, and the battery pack 28 is disposed at locations at the vehicle lower side of the floor panel 16, between the rockers 18 as seen in the vehicle vertical direction. Therefore, space at the vehicle lower side of the floor panel 16 may be used for disposition of the battery pack 28, and power may be supplied by the battery pack 28 to the power unit installed in the vehicle 10.

Now, if the vehicle body 12 is deformed by an impact load in the vehicle width direction during a side impact of the vehicle 10, the deformation is likely to also affect the battery pack 28 disposed at the vehicle lower side of the floor panel 16.

In the present exemplary embodiment, however, the cross-sectional shapes of the cross-members 34 and 36 seen in the vehicle width direction and the cross-sectional shapes of the linking cross-members 38 seen in the vehicle front-rear direction are formed as hat shapes that are open to the side thereof at which the floor panel 16 is disposed, and the cross-members 34 and 36 and the linking cross-members 38 are joined to the floor panel 16. Thus, the cross-members 34 and 36 and linking cross-members 38 may respectively form chamber structures with the floor panel 16. As a result, stiffness of the vehicle body 12 with respect to an impact load in the vehicle width direction may be assured, and effects of the impact load on the battery pack 28 may be moderated. Thus, the present exemplary embodiment may suppress deformation of the vehicle body 12 by an impact load in the vehicle width direction during a side impact of the vehicle 10, and the battery pack 28 may be disposed in a secure state.

Supplementary Descriptions of the Above Exemplary Embodiment (1) In the exemplary embodiment described above, two of the linking cross-members 38 are disposed between the cross-members 34 and 36, but this is not a limitation. For example, structures are possible in which one linking cross-member 38 is disposed along the center line CL between the cross-members 34 and 36, or three or more of the linking cross-members 38 are arranged along the vehicle width direction between the cross-members 34 and 36. Positions of the linking cross-members 38 need not necessarily be set close to the center line CL as described above, but do need to be set so as to be symmetrical about the center line CL. In other words, positions of the linking cross-members 38 may be modified as appropriate in accordance with the structure of the vehicle 10 and suchlike.

(2) In the exemplary embodiment described above, two cross-members are arranged in the vehicle body 12, but this is not a limitation. For example, structures are possible in which three or more cross-members are arranged in the vehicle front-rear direction and the linking cross-members 38 span between cross-members that are adjacent.

(3) In the exemplary embodiment described above, the cross-members 34 and 36 and the linking cross-members 38 are disposed at the vehicle upper side of the floor panel 16. However, in accordance with the structure of the vehicle 10 and suchlike, structures are possible in which the cross-members 34 and 36 and the linking cross-members 38 are disposed at the vehicle lower side of the floor panel 16.

What is claimed is:

1. A vehicle framework structure comprising:
    a pair of rockers that structure portions of a vehicle body, the rockers extending in a vehicle front-rear direction along periphery edge portions at vehicle width direction outer sides of a floor portion of the vehicle body;
    a floor panel that extends in the vehicle width direction and the vehicle front-rear direction, the floor panel forming a part of the floor portion;
    a plurality of cross-members that extend in the vehicle width direction and span between the rockers, the plurality of cross-members being joined to an upper surface of the floor panel, end portions at the vehicle width direction outer sides of the cross-members being joined to the respective rockers; and
    a linking cross-member that spans between
        (i) a first side wall portion structuring a portion of one of the cross-members and extending in the vehicle width direction and
        (ii) a second side wall portion structuring a portion of another of the cross-members and extending in the vehicle width direction,
    the one cross-member and the another cross-member being adjacent in the vehicle front-rear direction, the second side wall portion opposing the first side wall portion in the vehicle front-rear direction, an end portion at one side in the vehicle front-rear direction of the linking cross-member being joined to the first side wall portion, and an end portion at the other side in the vehicle front-rear direction of the linking cross-member being joined to the second side wall portion.

2. The vehicle framework structure according to claim 1, wherein a plurality of the linking cross-member are arranged in the vehicle width direction.

3. The vehicle framework structure according to claim 1, wherein:
    cross-sectional shapes of the cross-members seen in the vehicle width direction and a cross-sectional shape of the linking cross-member seen in the vehicle front-rear direction are formed as hat shapes that are open to a side thereof at which the floor panel is disposed, and the linking cross-member is joined to the floor panel; and
    the vehicle framework structure is configured to accommodate an electric power supply component, which is capable of supplying electric power to a power unit installed in the vehicle at a location that is at a vehicle lower side of the floor panel and between the rockers as seen in a vehicle vertical direction.

* * * * *